United States Patent [19]
Rosset

[11] Patent Number: 5,954,270
[45] Date of Patent: Sep. 21, 1999

[54] AGRICULTURAL MACHINE WITH A BOOM FOR DISPENSING MATERIAL

[75] Inventor: Rene Rosset, Winnipeg, Canada

[73] Assignee: Rosset Machinery Company Ltd., Winnipeg, Canada

[21] Appl. No.: 08/577,006

[22] Filed: Dec. 26, 1995

[51] Int. Cl.[6] .................................................... B05B 1/20
[52] U.S. Cl. ...................... 239/159; 239/164; 239/166; 239/172
[58] Field of Search .................................. 239/146, 159, 239/164, 166, 172, 161, 163, 167

[56] References Cited

U.S. PATENT DOCUMENTS

| | | | |
|---|---|---|---|
| 3,055,594 | 9/1962 | Nansel | 239/166 |
| 3,544,009 | 12/1970 | Schulueter | 239/159 |
| 3,655,130 | 4/1972 | Patrick | 239/77 |
| 3,807,676 | 4/1974 | Bieker et al. | 239/167 |
| 3,887,132 | 6/1975 | Widmer | 239/166 |
| 4,168,800 | 9/1979 | Quick | 239/164 |
| 4,288,034 | 9/1981 | Widmer et al. | 239/168 |
| 4,379,522 | 4/1983 | Elliott et al. | 239/167 |
| 4,394,968 | 7/1983 | Tyler | 239/167 |
| 5,353,988 | 10/1994 | Gallenberg | 239/164 |
| 5,375,767 | 12/1994 | Thorstensson | 239/164 |

FOREIGN PATENT DOCUMENTS 2423126  12/1979  France ................................. 239/164

*Primary Examiner*—Joseph A Kaufman
*Assistant Examiner*—Lisa Ann Douglas
*Attorney, Agent, or Firm*—Adrian D. Battison; Murray E. Thrift

[57] ABSTRACT

A machine for distributing material over crops comprises a vehicle for moving across the ground together with a single boom which projects out from one side of the vehicle over a length which can be of the order of 120 feet. The boom is self-supporting and formed by four rails at the corners of a rectangle together with a plurality of sets of spaced cross struts and longitudinal cables so that each of the rails is under compressive load. The boom is thus self-supporting and is coupled to a center cradle only at the ends of the rails. The boom can be broken down into separate sections. The cradle is a rectangular frame structure which is suspended on a horizontal tubular beam by a sleeve surrounding the beam having a diameter slightly bigger than the beam so that pivotal movement of the cradle tends to roll the sleeve around the beam thus lifting the center of gravity and dampening the pivotal action. A counterweight for the boom is mounted on an arm which can swivel about a vertical axis from an outwardly projecting working position to a retracted position alongside the cradle.

8 Claims, 4 Drawing Sheets

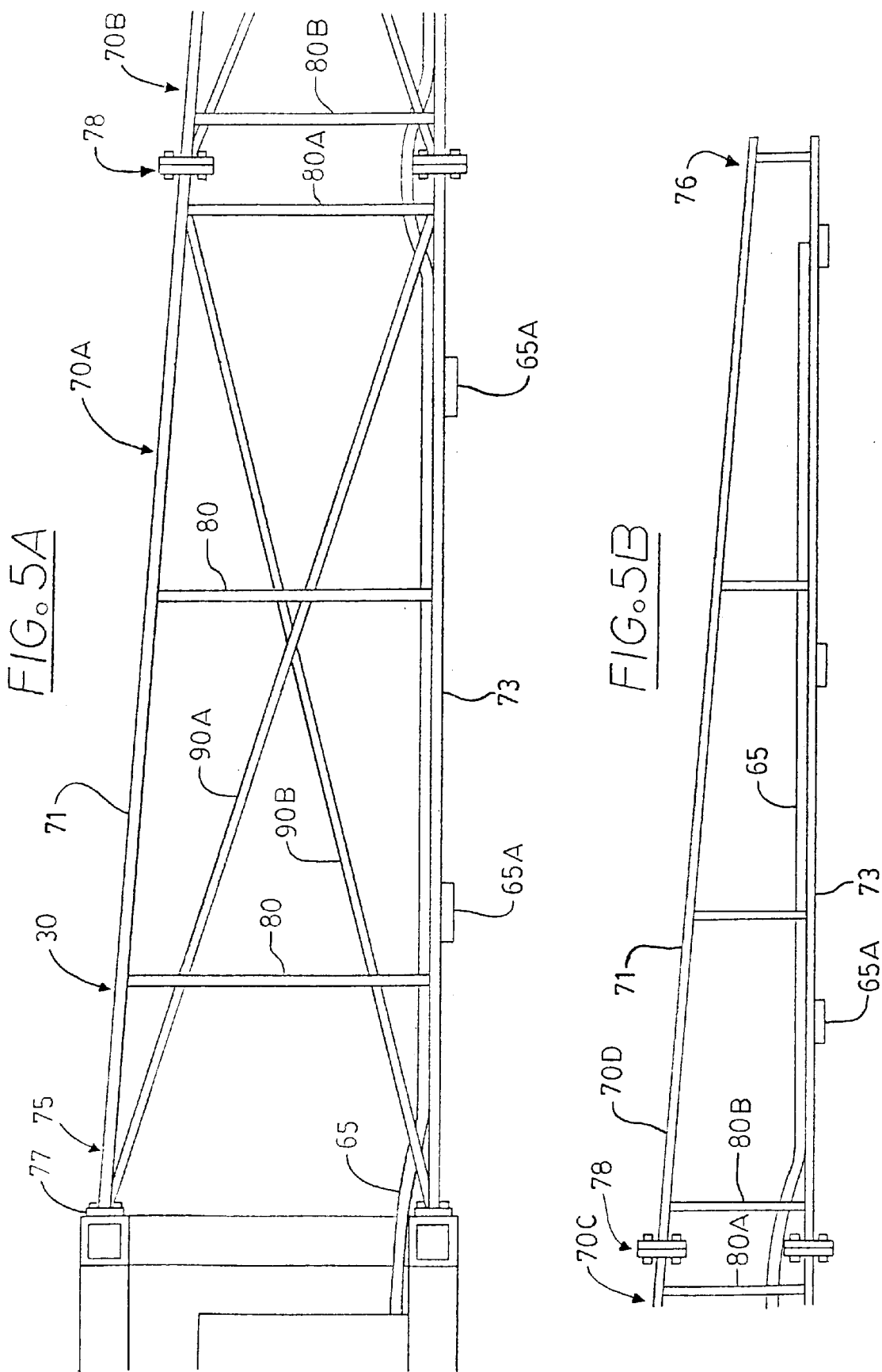

AGRICULTURAL MACHINE WITH A BOOM FOR DISPENSING MATERIAL

FIELD OF THE INVENTION

This invention relates to an agricultural machine having a boom for dispensing material onto a crop which can carry either spray nozzles for a liquid material or a plurality of air transportation ducts for transporting and dispensing particulate material or both.

BACKGROUND

The machine for which the present invention is particularly designed is one in which there is provided a single elongate boom which is suspended wholly from one end on a transportation vehicle and projects out over a crop for dispensing the materials onto the crop. The boom can extend for a long distance up to 120 feet or more so as to allow the vehicle to be transported on one side only of the crop area and to apply the materials over a wide band of the crop. Such machines are particularly designed for intensive farming situations such as cranberries or house plants, although of course other crops may be handled using the proposed machine.

This type of single very long boom is generally not used in less intensive farming in which the crop is evenly spread over a whole field since such vehicles generally use a double sided boom of shorter length to allow increased transportation speeds and to avoid the necessity for dedicated tracks between the farming areas.

Conventionally machines of this general type include a vehicle or trailer on which is mounted a central support section including a tower. A boom is suspended out to one side and is carried by a plurality of cables which extend from the tower downwardly and outwardly to connect to the boom structure at spaced positions along the length of the boom structure. Such a vehicle is very unwieldy and difficult to maneuver since it is relatively high. The machine is therefore very difficult to transport from one area to another.

In addition in order to limit the size of the machine, a counterweight is placed on the central vehicle to counter the weight of the boom and is placed closely into the vehicle and therefore is a very heavy weight thus increasing the total weight of the vehicle.

Yet further, the boom must be suspended so it can pivot relative to the central vehicle to accommodate tilting movement of the vehicle as it moves across the ground while, as far as possible, maintaining the boom at a constant height from the ground along its length. The pivoting arrangement of the conventional vehicles is generally unsatisfactory leading to excessive changes in height of the boom relative to the ground which can significantly interfere with the spread pattern or the material to be distributed.

SUMMARY OF THE INVENTION

It is one object of the present invention, therefore, to provide an improved machine having a boom for distributing material onto a crop in which the boom is effectively self-supporting without the necessity for a tower and cable support.

It is another object of the present invention to provide a machine of this type which avoids the necessity for a very heavy counterweight and yet allows the vehicle to be relatively narrow in its transportation position.

It is yet a further object of the present invention to provide a machine which allows pivotal movement of the boom relative to a central mounting frame while providing effective damping of that movement to maintain the boom, as far as possible, at a constant height from the ground.

According to the invention there is provided an agricultural machine for dispensing material onto a crop comprising: a mounting frame arranged for transportation of the mounting frame on a transportation vehicle for movement across the ground in a working direction; a carrying frame supported on the mounting frame for pivotal movement relative thereto about an axis longitudinal of the working direction; a horizontal boom attached to the carrying frame and projecting outwardly therefrom to one side of the mounting frame for carrying a plurality of material dispensing elements at spaced positions along the length of the boom;

the boom comprising: at least three longitudinally extending rails including at least one horizontally spaced top rail and two horizontally spaced bottom rails with the at least one top rail being spaced vertically from the bottom rails; a plurality of sets of cross beams at longitudinally spaced positions along the rails, each set of cross beams connecting the rails at a respective one of the positions therealong; connecting means for connecting an inner end of each of the rails to the carrying frame; and tension cables connected along the boom and arranged such that each of the rails including the top rails is in compressive load at least at a first portion of its length adjacent said connecting means.

According to a second aspect of the invention there is provided an agricultural machine for dispensing material onto a crop comprising: a mounting frame arranged for transportation of the mounting frame on a transportation vehicle for movement across the ground in a working direction; a carrying frame supported on the mounting frame for pivotal movement relative thereto about an axis longitudinal of the working direction; a horizontal boom attached to the carrying frame and projecting outwardly therefrom to one side of the mounting frame for carrying a plurality of material dispensing elements at spaced positions along the length of the boom; the boom comprising a single boom so as to project outwardly only to one side of the carrying frame; and a counterweight member attached to the carrying frame so as to project outwardly therefrom to a side opposite to the boom; the counterweight member including a counterweight and an arm, the arm being pivotally mounted relative to the carrying frame so as to move from an outwardly extending position to an inward folded position.

According to a third aspect of the invention there is provided an agricultural machine for dispensing material onto a crop comprising: a mounting frame arranged for transportation of the mounting frame on a transportation vehicle for movement across the ground in a working direction; a carrying frame supported on the mounting frame for pivotal movement relative thereto about an axis longitudinal of the working direction; a horizontal boom attached to the carrying frame and projecting outwardly therefrom to one side of the mounting frame for carrying a plurality of material dispensing elements at spaced positions along the length of the boom; the mounting frame including a front frame support, a rear frame support and an elongate beam therebetween extending longitudinally of the working direction; the carrying frame including a tube arranged longitudinally of the working direction and at a height above a center of gravity of the carrying frame with the boom thereon; the beam having a cylindrical outer surface and the tube having a cylindrical inner surface of a diameter greater than that of the outer surface of the beam; the tube being mounted on the outside of the beam so as to be rotatable about an axis centrally of the outer surface of the beam; the difference in diameter being sufficiently great to leave a space between the inner surface and the outer surface and the surfaces being directly in contact to generate friction therebetween, such that rotation that tends to cause a rolling action which lifts the tube relative to the beam to provide automatic damping of the pivotal movement.

BRIEF DESCRIPTION OF THE DRAWINGS

In the accompanying drawings, which illustrate an exemplary embodiment of the present invention:

FIG. 5A and FIG. 5B are rear elevational views of an inner part and outer part respectively of the boom.

DETAILED DESCRIPTION

Figure 1:
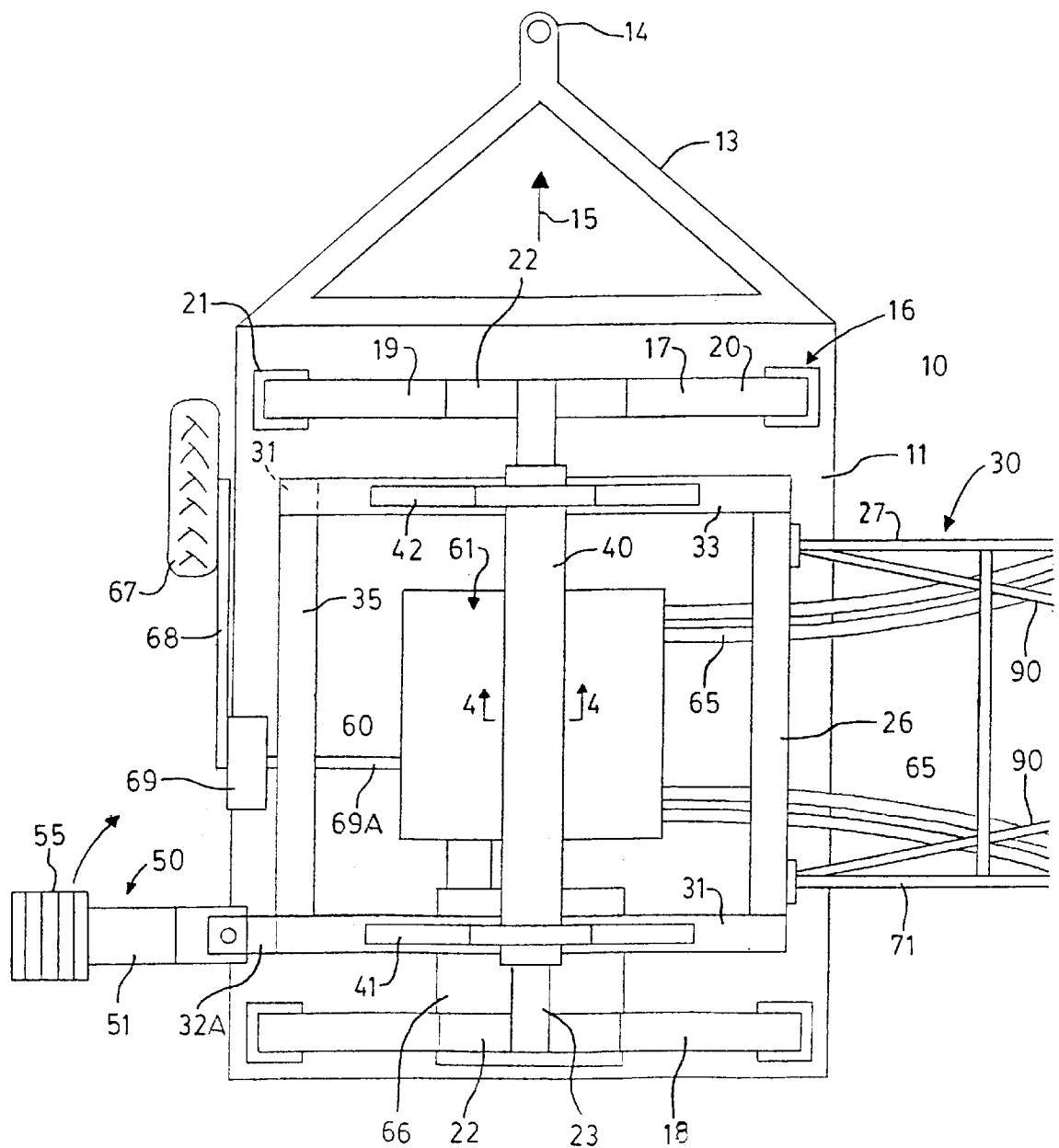
FIG. 1 is a top plan view of the machine according to the present invention.
Figure 2:
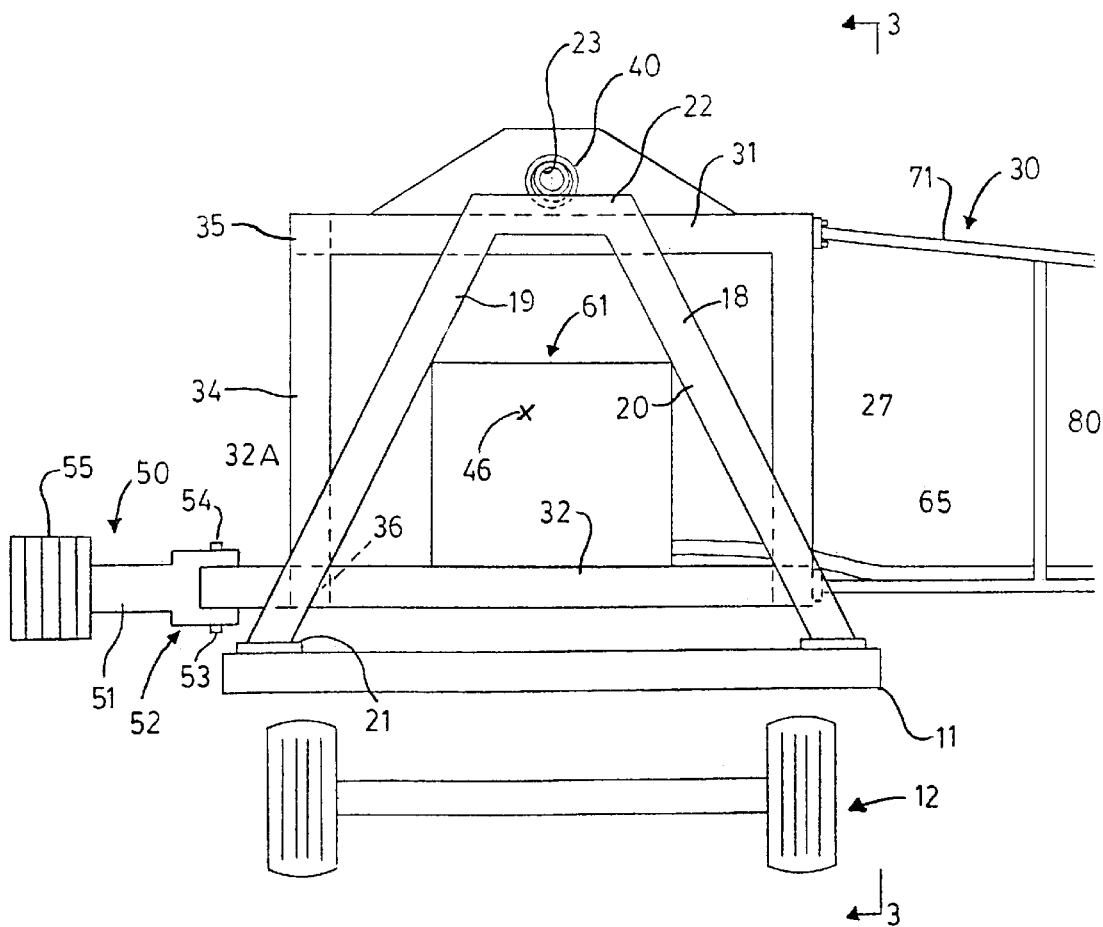
FIG. 2 is a rear elevational view of the machine of FIG. 1.

The machine comprises a trailer 10 having a trailer bed 11 mounted on a ground wheel support system 12 and having a hitch frame 13 at a forward end with a hitch coupling 14 at a center forward position of the hitch frame for attachment to a towing vehicle. The trailer is shown only schematically since its details can vary and are well known to one skilled in the art. In addition the trailer can be replaced by a self-propelled vehicle if preferred. It is appreciated therefore that the machine is arranged for transportation in a longitudinal working direction 15 for movement along a row or bed of crops to be acted upon by the machine for the dispensing of material.

On the bed 11 is arranged a mounting frame generally indicated at 16 including a front stanchion 17 and a rear stanchion 18. Each of these stanchions comprises a pair of upwardly and inwardly inclined beams 19 and 20 with each of the beams having a base pad 21 bolted to the bed to support the stanchion in vertical position. At the top of the beams 19 and 20 is provided a horizontal support beam 22. Across the support beams 22 is mounted an elongate beam 23 which has a cylindrical outer surface 24. The beam 23 is preferably tubular and formed of a circular cylindrical pipe of a diameter selected to provide sufficient strength to carry the elements described hereinafter. The pipe 23 is attached to the horizontal beams 22 by suitable attachment so that the beam 23 is fixed in place and held against rotation about its axis.

Within the mounting frame 16 is mounted a support frame or cradle generally indicated at 25. The cradle 25 is rectangular in shape and defined by 12 square tubular beams welded at their ends to form a hollow rectangular box.

Thus the cradle 25 defines one vertical face formed by four beams 26, 27, 28 and 29 with that face arranged adjacent one side of the trailer for supporting a boom 30.

The beams 26 through 29 forming the main side face of the cradle are attached to four horizontal transverse beams including top and bottom beams 31 and 32 respectively at one end of the cradle and top and bottom stub beams 33 and 34 at the forward end of the cradle. The cradle is completed by an opposite side face defined by four beams 34, 35, 36 and 37 symmetrical to and opposite from the beams 26 through 29 at the first side face of the cradle.

The cradle is supported on the mounting frame by an elongate sleeve 40 which is mounted on the outside of the beam 23 and extends longitudinally therealong. The sleeve 40 is attached to each of the top transverse beams 31 and 33 by a pair of gusset plates 41 and 42 which are welded along the top of the beams 31 and 33 respectively and extend over the sleeve 40 with a hole through which the sleeve passes with the sleeve welded to the gusset plates at the hole to provide a rigid structure.

Figure 4:
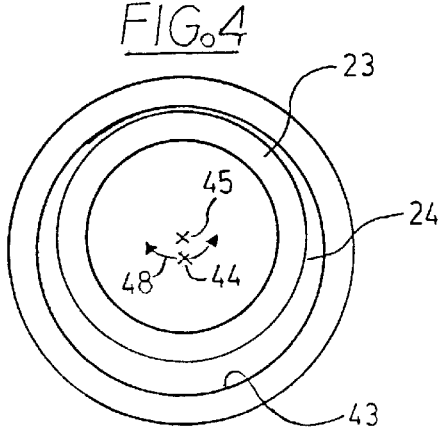
FIG. 4 is a cross sectional view along lines 4—4 of FIG. 1 on an enlarged scale showing the interconnection between the supporting members.

As shown in FIG. 4, the sleeve 40 has an inside surface 43 which is of a diameter larger than that of the outside surface 24 of the beam 23. Thus a center 44 of the sleeve 43 is below a center 45 of the beam 23. The cradle is intended to be maintained in fixed position with its center of gravity 46 vertically below the center 44. However in the event that the vehicle is tilted by a change in ground level, the beam 23 rotates inside the sleeve 40 and tends to cause a rotation of the cradle to follow the tilting of the vehicle. However the center of gravity 46 attempts at all times to remain beneath the center 44 so that the sleeve 40 rotates relative to the beam 23. While some of this rotation is effected by slippage between the directly contacting surfaces 24 and 43, some of the rotation is caused by a rolling action of the sleeve around the beam and this rolling action tends to lift the center 44 in the direction of the arrow 48. This lifting of the center 44 similarly lifts the center of gravity and thus requires energy to raise the center of gravity. This energy is taken from the momentum of the cradle and thus reduces or dampens the tendency of the cradle to pivot about the center 44. Thus any pivoting action which commences due to changes in height of the ground level is quickly dampened allowing the boom to remain horizontal and at a constant height from the ground along its length. It is appreciated that this dampening action on the pivotal movement is important since even a very small angle of tilt of the cradle will, in a very long boom of the order of 120 feet in length, cause significant change in height from the ground of the outer end of the boom.

The boom 30 extends from the side face of the cradle only out to one side of the cradle generally at right angles to the working direction 15. In order to counter-balance the boom 30 there is provided a counter-balance weight assembly 50. The weight assembly includes a stub beam 32A which defines an extension portion of the beam 32 of the cradle and extends outwardly beyond the side frame in a direction opposite to the boom. The stub beam 32A is connected to a swivel arm 51 by a pivot coupling 52 including a pivot pin 53 defining a vertical axis 54 about which the pivot arm 51 can pivot. The swivel arm 51 carries a plurality of metal saddle weights 55 of the type often used for weighting a tractor. The swivel arm 51 can therefore move from a working position in which it forms an extension of the stub beam 32A to project outwardly from the side of the cradle opposite to the boom to a retracted position parallel to the beam 36 in which the swivel arm 51 and the weights 55 are retracted to a position inboard of the trailer for transportation.

The arm 51 can therefore be relatively long so that the weights 55 are supported outwardly from the cradle thus reducing the amount of absolute weight necessary to counter-balance the boom 30. Thus the metal saddle weights can be used to provide sufficient weight for counter-balance without necessity for a massive counter-balance weight which would otherwise be necessary if the arm 51 were not available.

The cradle 25 further comprises a base support defined by the horizontal bottom beams 28, 32, 34 and 36, a floor structure 60 can be provided in this area for support of the various elements necessary for distribution of the material to be dispensed. In addition the floor 60 includes a rearwardly projecting portion 60a which projects beyond the rear of the cradle for supporting various other elements of the distribution apparatus.

The distribution apparatus can vary in accordance with requirements and may include a spray tank for dispensing liquid to a spray line and spray nozzles on the boom. In the example shown, the distribution apparatus comprises a commercially available pneumatic dispensing system generally indicated at 61 which is available from Valmar Airflo Inc. of Manitoba, Canada, and which includes a hopper 62 and a plurality of dispensing wheels 64 which meter the materials in the hopper into a plurality of dispensing ducts 65. The system 61 further includes a fan 66 mounted on the floor section 60A. All of this distribution system is mounted on the cradle for pivotal movement therewith so that the ducts 65 can be rigidly connected to the distribution system.

The distribution apparatus further includes a ground wheel 67 carried on an arm 68 alongside the trailer with the ground wheel 67 driving a gearbox 69 which communicates ground speed through a shaft 69A to the distribution system 61.

Figure 3:
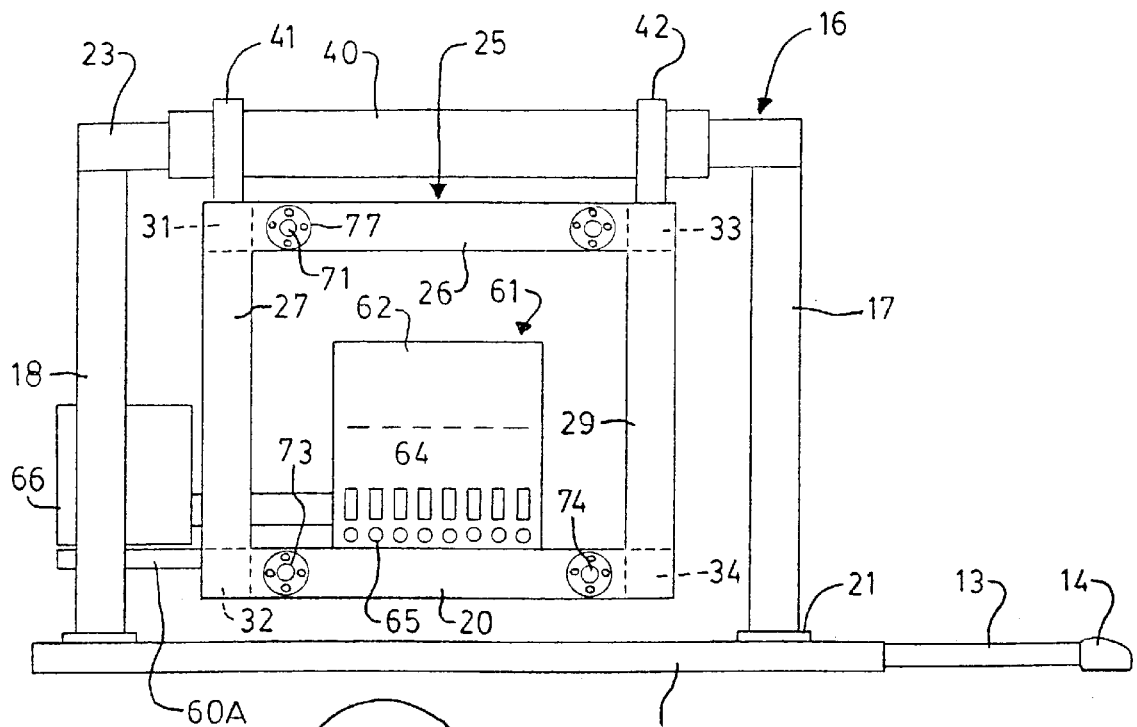
FIG. 3 is a side elevational view of the machine taken along lines 3—3 of FIG. 2.

The boom 30 comprises four elongate rails 71, 72, 73 and 74. These rails are formed from tubular aluminum of circular cross section and are arranged at the apexes of a rectangular as best shown in the cross sectional view in FIG. 3. Thus there are two top rails 71 and 72 which are horizontally spaced. There are two bottom rails 73 and 74 which are horizontally spaced. The top rails 71 and 72 are vertically spaced from the bottom rails 73 and 74. The distance of the spacing is selected in accordance with engineering principles to provide a rigid structure together with the elements forming the boom as defined hereinafter. The rails are effectively continuous along the full length of the boom as shown in FIGS. 5A and 5B so that the rails gradually taper inwardly thus reducing the distance between the rail from the inner end at the cradle to the outer end 76.

While the boom as shown includes four rails, the number can be as few as three arranged in a triangle or more than four as required.

The inner end 75 at the cradle is attached to the cradle by four end plates 77 each of which is welded directly at right angles to the inner end of the respective rail. The plates 77 are then bolted to the top and bottom beams 26 and 28 of the side face of the cradle so to be rigidly coupled to the side face.

While the boom is formed in manufacture in a single piece by stretching out the rails from the inner end 75 to the outer end 76, the boom is separated into plurality of separate sections by coupling plates 78. Thus after manufacture in a single piece, the boom is cut into separate sections by cutting through the rails 71 through 74 and by welding on the coupling plates 78 so that the rails can be bolted back together to form the continuous boom. However the boom can then be disassembled for transportation and formed into the separate sections.

As shown the boom can be of a length of the order of 120 feet or more separated into four or more sections 70A, 70B, 70C and 70D.

Along the length of the assembled boom is provided a plurality of sets of transverse struts 80 arranged at spaced positions along the length of the boom. Each set of transverse struts includes four struts which are arranged with two of the struts vertical and two of the struts horizontal. The vertical struts interconnect the rails 71, 73 and 72, 74 respectively. The horizontal struts interconnect the rails 71, 72 and 73, 74 respectively. The sets of connecting struts 80 are arranged at positions along the length of the boom which are calculated to provide structural strength to the rails to prevent collapse of the rails inwardly or outwardly of a longitudinal axis along the length of the boom.

The sets 80 are arranged so that two of the sets indicated at 80a and 80b respectively are arranged closely adjacent the coupling plate 78 so as to hold the rails rigid at that point so the structure remains stable when disconnected.

In addition to the rails and the cross struts, the boom is rendered stable by longitudinally extending cables 90. The cables as shown extend substantially along the full length of each of the sections. The cables are diagonal to the boom length so that the first of the cables 90A extends from the inner end of the rail 71 to the end of the rail 74 adjacent the coupling plate 78. Similarly a cable 90B extends from the inner end of the rail 73 to the outer end of the rail 72 adjacent the coupling plate 78.

The arrangement of cables can be varied in accordance with engineering calculations so that additional cables may be provided from the inner end to a position part way along each section. The outermost section 70d may not need such cables since it is required to support a significantly reduced amount of weight.

The cables are tensioned so that each of the rails is under compressive load. This applies particularly to the rails 71 and 72 at the top of the boom since normally, without these cables, the upper rails would be under a tension load. However the cables and particularly the upper cables 90a are under sufficient tension to apply a compressive load to the upper rails so the whole boom is thus under compressive load and thus remains structurally stable against horizontal or vertical bending.

The cables are arranged wholly within the boom so none of the cables are above or below the boom or on either side of the boom so that the boom is in effect a self-supporting stable structure.

The only connection between the boom and the cradle is provided through the coupling plates 77 so that there is no tower nor any other stabilizing elements projecting outwardly beyond the boom to the side of the boom and no necessity for any cables interconnecting such elements to the boom. The boom is thus a self-supporting structure.

The discharge ducts 65 are simply draped along the boom over the bottom cross struts at the sets 80 and each discharge duct extends to a respective discharge head 65A which acts to distribute the material in a distribution pattern.

While one embodiment of the present invention has been described in the foregoing, it is to be understood that other embodiments are possible within the scope of the invention. The invention is to be considered limited solely by the scope of the appended claims.

I claim:

1. An agricultural machine for dispensing material onto a crop comprising:

a mounting frame arranged for transportation of the mounting frame on a transportation vehicle for movement across the ground in a working direction;

a carrying frame supported on the mounting frame for pivotal movement relative thereto about an axis longitudinal of the working direction;

a horizontal boom attached to the carrying frame and projecting outwardly therefrom to one side of the mounting frame for carrying a plurality of material dispensing elements at spaced positions along the length of the boom;

the boom comprising:

at least three longitudinally extending rails including at least one horizontally spaced top rail and two horizontally spaced bottom rails with said at least one top rail being spaced vertically from the bottom rails;

a plurality of sets of cross beams at longitudinally spaced positions along the rails, each set of cross beams connecting the rails at a respective one of the positions therealong;

connecting means for connecting an inner end of each of the rails to the carrying frame;

and a plurality of tension cables connected along the boom and arranged within an area defined by the rails of the boom;

some of the tension cables having one end connected to one of the bottom rails and an opposed end connected to said at least one top rail and extending diagonally therebetween and some of the tension cables lying generally in a horizontal plane and having one end connected to one of the rails and an opposed end connected to another of the rails and extending generally diagonally therebetween such that the tension cables place all of the rails under compression so as to effect stiffening of the boom;

the tension cables being free from connection to the carrying frame such that the connecting means forms the only connection between the carrying frame and the boom and the whole of the weight of the boom is connected through the connecting means.

2. The machine according to claim 1 wherein the longitudinal rails are cut into separate pieces at longitudinally spaced positions along the length thereof so that the boom can be separated into a plurality of separate portions with each portion including a piece of the longitudinally extending rails and a plurality of the sets of cross beams.

3. The machine according to claim 2 wherein the portions of the boom are connected by four separate bolted couplings each associated with a respective one of the rails.

4. The machine according to claim 1 wherein the connecting means comprises a plurality of separate bolted couplings, each coupling being associated with a respective one of the rails.

5. An agricultural machine for dispensing material onto a crop comprising:

a mounting frame arranged for movement across the ground in a working direction;

a carrying frame supported on the mounting frame for pivotal movement relative thereto about a horizontal axis longitudinal of the working direction;

a horizontal boom attached to the carrying frame and projecting outwardly therefrom to one side of the mounting frame at right angles to the horizontal axis for carrying a plurality of material dispensing elements at spaced positions along the length of the boom;

the boom comprising a single boom so as to project outwardly only to one side of the carrying frame;

and a counterweight member attached to the carrying frame so as to project outwardly therefrom to a side opposite to the boom;

the counterweight member including a counterweight and an arm, the arm being mounted on the carrying frame for pivotal movement relative to the carrying frame and relative to the boom about a vertical axis so as to move from a folded position in which the center of gravity of the counterweight member is closely adjacent the horizontal axis to an extended position in which the center of gravity of the counterweight member is moved relative to the carrying frame and relative to the boom outwardly from the horizontal axis.

6. An agricultural machine for dispensing material onto a crop comprising:

a mounting frame arranged for transportation of the mounting frame on a transportation vehicle for movement across the ground in a working direction;

a carrying frame supported on the mounting frame for pivotal movement relative thereto about an axis longitudinal of the working direction;

a horizontal boom attached to the carrying frame and projecting outwardly therefrom to one side of the mounting frame for carrying a plurality of material dispensing elements at spaced positions along the length of the boom;

the mounting frame including a front frame support, a rear frame support and an elongate beam therebetween extending longitudinally of the working direction;

the carrying frame including a tube arranged longitudinally of the working direction and at a height above a center of gravity of the carrying frame with the boom thereon;

the beam having a cylindrical outer surface and the tube having a cylindrical inner surface of a diameter greater than that of the outer surface of the beam;

the tube being mounted on the outside of the beam so as to be rotatable about an axis centrally of the outer surface of the beam;

the carrying frame and the tube being carried between the front frame support and the rear frame support;

the difference in diameter being sufficiently great to leave a space between the inner surface and the outer surface and the surfaces being directly in contact to generate friction therebetween, such that rotation that tends to cause a rolling action which lifts the tube relative to the beam to provide automatic damping of the pivotal movement.

7. The machine according to claim 6 wherein the carrying frame includes a horizontal base for mounting including distribution apparatus thereon for distributing the material dispensing elements such that the distribution apparatus is pivotal with the carrying frame.

8. The machine according to claim 6 wherein the carrying frame includes four beams lying in a common vertical plane and defining an attachment frame for receiving the boom directly coupled thereto.

* * * * *